Figure 3:
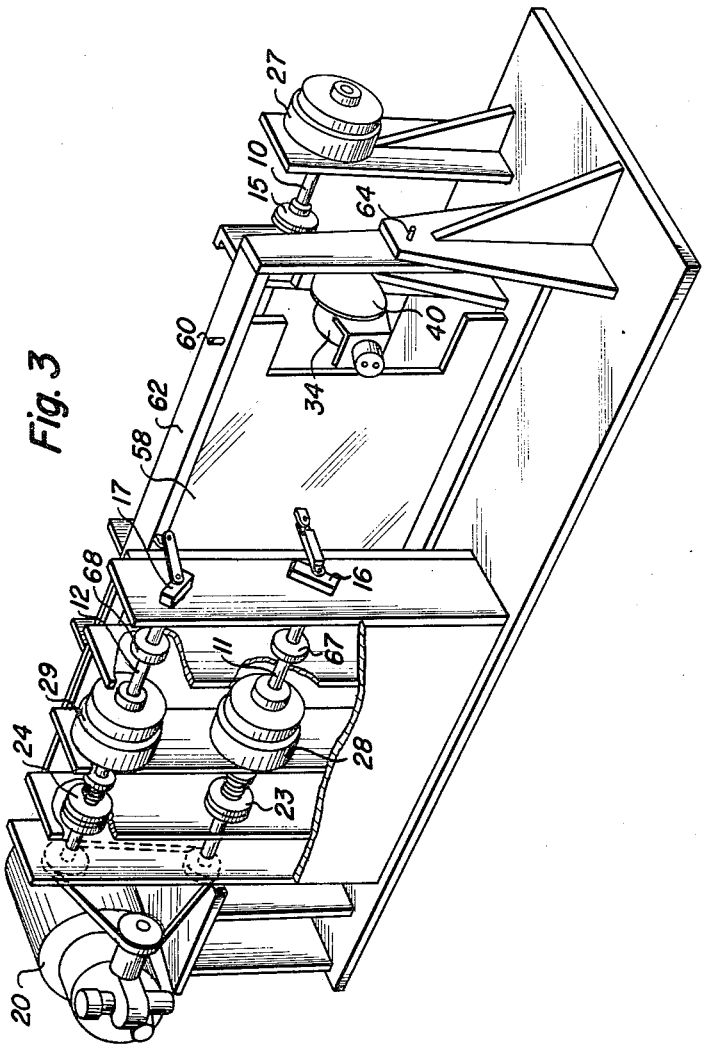

July 10, 1962    C. S. FITZGERALD ET AL    3,043,184
METHOD AND APPARATUS FOR ALIGNING LAMPS AND REFLECTORS
Filed June 26, 1959    4 Sheets-Sheet 1
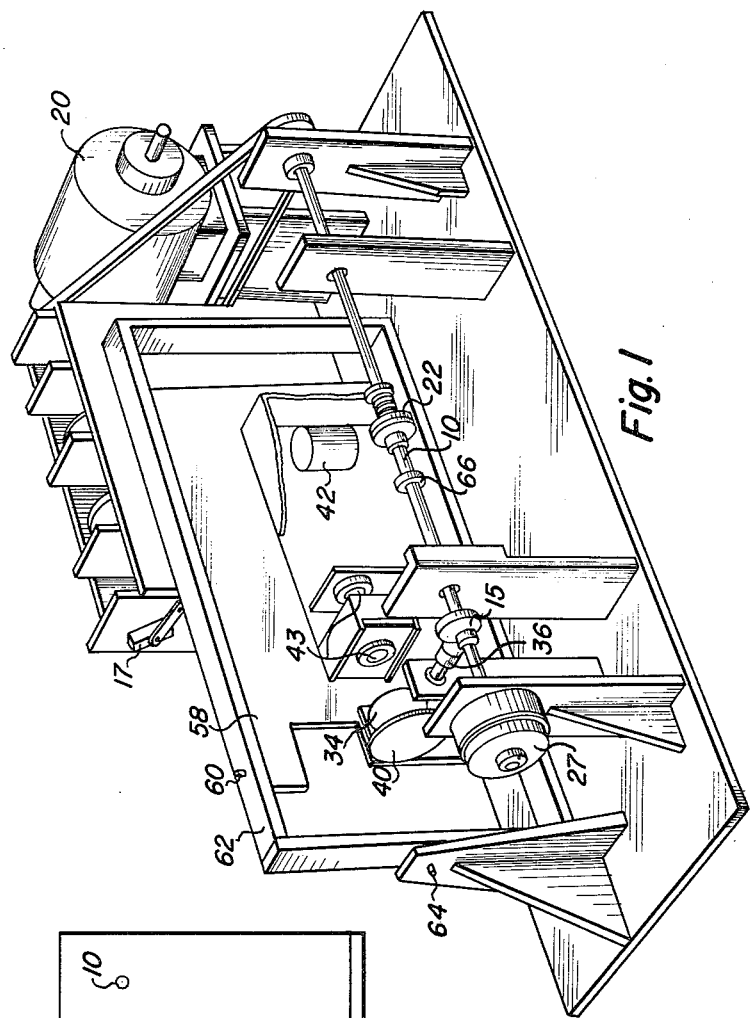
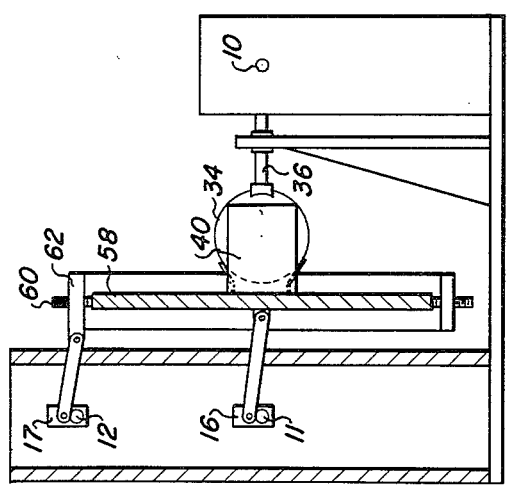
CHARLES S. FITZGERALD
DAVID B. ANDERSON
INVENTORS
BY R. Frank Smith
Robert W. Hampton
ATTORNEYS

CHARLES S. FITZGERALD
DAVID B. ANDERSON
INVENTORS

ATTORNEYS

CHARLES S. FITZGERALD
DAVID B. ANDERSON
INVENTORS

ATTORNEYS

July 10, 1962 C. S. FITZGERALD ET AL 3,043,184
METHOD AND APPARATUS FOR ALIGNING LAMPS AND REFLECTORS
Filed June 26, 1959 4 Sheets-Sheet 4

CHARLES S. FITZGERALD
DAVID B. ANDERSON
INVENTORS
BY R. Frank Smith
Robert W. Hampton
ATTORNEYS

1

3,043,184
METHOD AND APPARATUS FOR ALIGNING
LAMPS AND REFLECTORS
Charles S. Fitzgerald and David B. Anderson, Rochester, N.Y., assignors to Eastman Kodak Company, Rochester, N.Y., a corporation of New Jersey
Filed June 26, 1959, Ser. No. 823,100
11 Claims. (Cl. 88—14)

The present invention relates to lamps with reflectors and more particularly concerns novel apparatus and method for aligning a lamp with a reflector in preparation for assembling these two elements.

Many types of apparatus, for example, motion picture projectors, require a concentrated beam of light for proper operation. A typical source of such light beam is an incandescent or other electric lamp disposed at a predetermined position relative to a reflector so that the light output of the lamp is concentrated or focused by the reflector into a desired beam or onto a desired object remote from the lamp.

In the past, several methods have been devised for locating a lamp at an optimum position relative to a cooperating reflector. The most obvious such method is by manual or other adjustment of one element relative to the other so that the lamp envelope or base assumes a predetermined spaced relation to the reflector surface. However, irregularities in lamp-filament configuration render this method only a rough approximation so that its practice produces relatively inefficient lamp-reflector units.

To overcome the deficiencies of the above method, many practitioners employ a screen in front of the lamp and reflector and manually adjust the lamp or reflector, while the lamp is energized, until the illumination of the screen appears to be optimum. This method accounts in some measure for irregularities in the lamp filaments but is somewhat slow and tedious and depends upon the ability of the operator to remember and compare screen illuminations that he sees only one at a time.

As an improvement of the last named method, a photocell has been used in place of the illuminated screen, and an electric current-measuring instrument has been energized by the cell to indicate by its maximum reading the optimum position of the lamp relative to the reflector. In order to eliminate the tedium and inefficiency of manual manipulation of the lamp and reflector in employing this method, an apparatus disclosed in the prior art automatically moves the lamp in three coordinate axial directions relative to the reflector while the photocell energizes a control circuit, which detects the first decrease in photocell output during the movement in each axial direction. When such decrease is detected, the control circuit stops the movement in that direction and initiates movement in a second direction at a right angle thereto. After movement of the lamp relative to the reflector in three axial directions the two elements should be almost in precise alignment. However, it is recognized that the latter method is inherently deficient in that the control circuit is required to detect a change (decrease) in the photocell output signal where such output signal seldom exhibits a sharp peak. Therefore, it is recommended that the entire process be repeated, in practicing this method, in order to achieve an alignment that will produce a really efficient source of light.

It is therefore a primary object of the present invention to align a lamp with a reflector with great precision during a single cycle of an automatic aligning apparatus.

A further object of the invention is to move an energized lamp relative to a reflector in each of three axial directions seriatim, to detect the lamp-reflector light output at a predetermined position during such movement, to store a manifestation of the maximum detected light intensity during each such movement, and to employ such stored manifestations for locating the lamp and reflector in optimum alignment in each axial direction.

Figure 4:
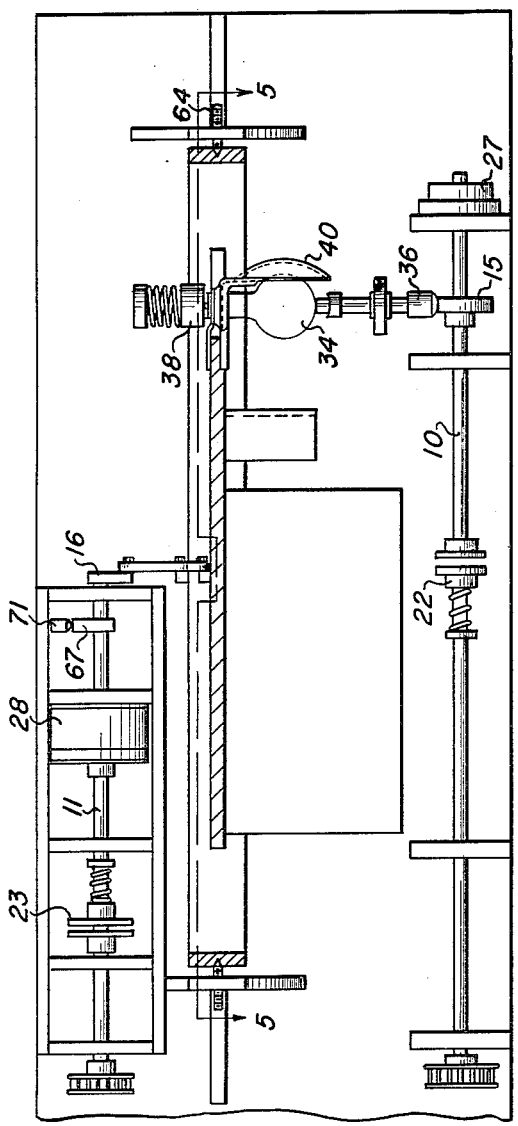
Figure 5:
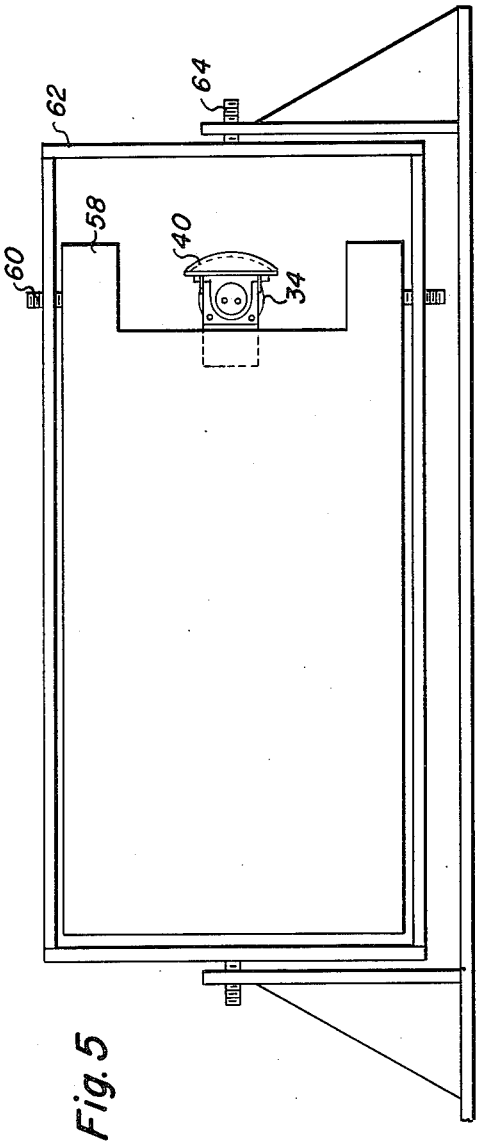
Figure 6:
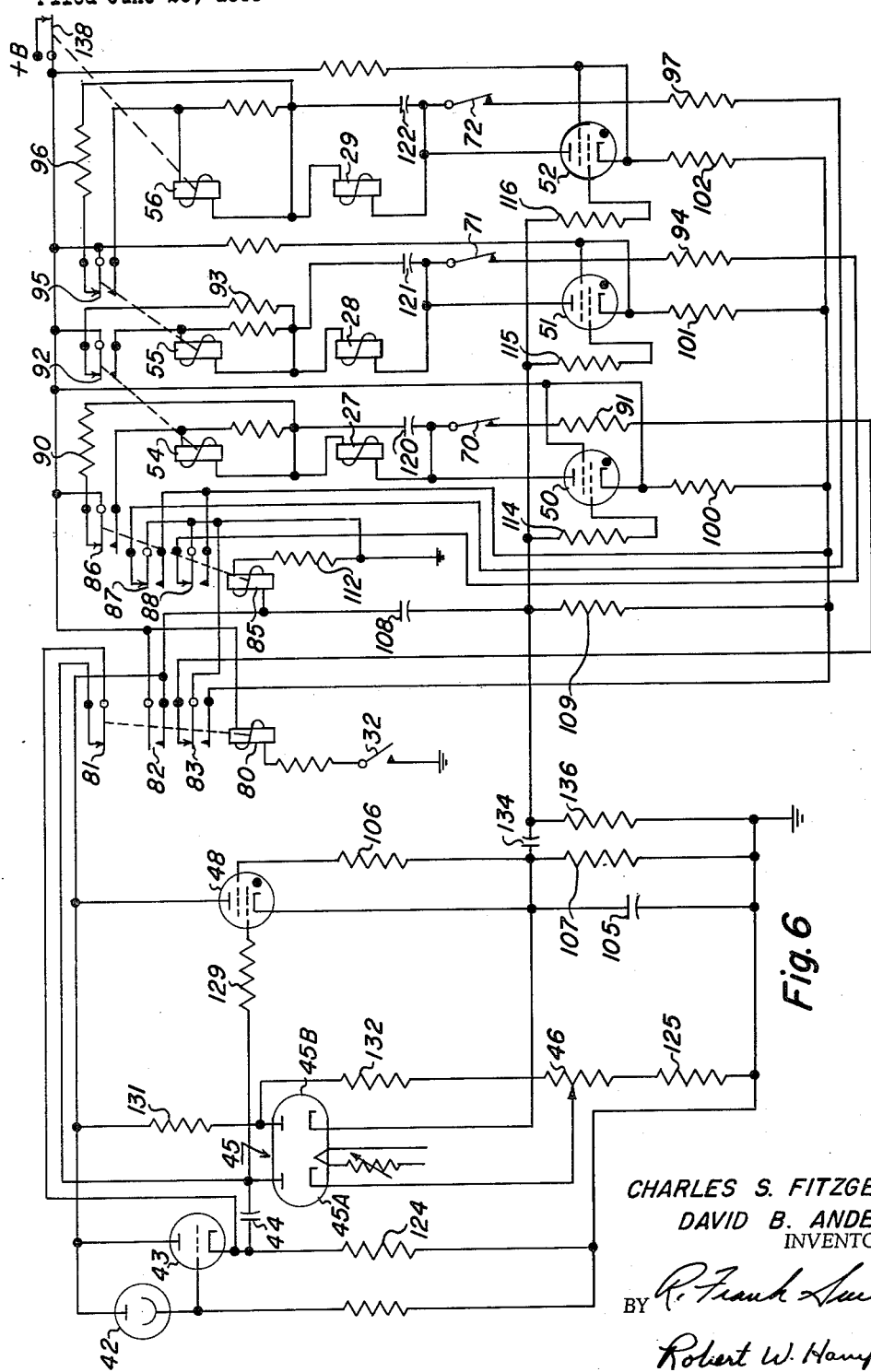

Other objects of the invention will become apparent from the following description, reference being made to the accompanying drawings, in which:

FIG. 1 is an isometric front view of the aligning fixture;
FIG. 2 is a sectional left side view of the fixture;
FIG. 3 is an isometric rear view of the fixture;
FIG. 4 is a bottom view of the fixture;
FIG. 5 is a sectional rear view of the fixture taken along the line 5—5 of FIG. 4; and
FIG. 6 is a schematic wiring diagram of the control circuit.

*In General*

The invention includes a mechanical fixture, which causes relative movement between an energized lamp and a reflector inserted into the fixture, thereby indexing the lamp relative to the reflector. The fixture holds the lamp and reflector on the axis of an optical system, which focuses light from the lamp and reflector onto a photocell. Relative movement between lamp and reflector occurs serially in three coordinate axial directions. During the movement in each axial direction a control circuit, which is energized by the photocell, stores in a memory device a manifestation of the maximum photocell signal that occurs. Subsequently, the memory device is employed for detecting the position of optimum alignment of the lamp and reflector in that axial direction.

*Aligning Fixture*

Positioning the lamp relative to the reflector is accomplished by causing relative motion between these two elements in a sequence of three motions along three respectively coordinate axes to determine optimum focusing of the lamp in each of the three axial directions. The relative motions of the lamp and reflector are achieved by sequentially rotating three control shafts 10, 11 and 12 (FIGS. 1, 2 and 3), each of which carries a respective cam or crank 15, 16 or 17 for cycling either the lamp 34 or the reflector 40 on one coordinate axis. Shafts 10 to 12 are yieldably driven by a motor 20 through respective slip clutches 22, 23 and 24.

The fixture starts with each control shaft in a reset position, where it is held by a respective normally energized magnetic brake 27, 28 and 29, with each of the cams or cranks 15 to 17 in an extreme position. First, a switch 32 (FIG. 6) is closed to condition the control circuit and de-energize brake 27 (FIGS. 1 to 3), thereby permitting the first control shaft 10 to be rotated through its friction clutch 22. The details of the control circuit of FIG. 6 will be described hereinafter. The lamp 34, which is energized and clamped between a holder 36 (see also FIG. 4) and a spring contact base 38, is moved by cam 15 from its reset position on one axis through its optimum position and on to its opposite extreme position on that axis. The optimum lamp position on the first axis is indicated by a maximum response from the photocell 42 (FIGS. 1 and 6), which is illuminated by light emitted by lamp 34 and focused by reflector 40 and a lens system 43 onto the photocell. While the lamp is being moved from its first to its second extreme position in the first axial direction, the photocell 42 charges a memory capacitor 44 (FIG. 6) to a voltage which is a function of the maximum light intensity falling on the cell, i.e., the optimum focus position of lamp 34 relative to reflector 40 in the first axial direction. Further rotation of cam 15 (FIG. 1) permits the lamp to return toward its first extreme position. At some time during this return movement of the lamp the light intensity at photocell 42 equals the maximum intensity during the first movement of the lamp and indicates optimum lamp position on the first axis. At this time a voltage comparison circuit, which includes the memory capacitor 44 (FIG. 6) and a potentiometer 46, fires a pulsing thyratron 48, which in turn fires a first control thyratron 50 in series with brake 27. The conduction of thyratron 50 re-energizes brake 27 to stop shaft 10 (FIG. 1) with the lamp in its optimum position in the first axial direction. When thyratron 50 (FIG. 6) fires, a first shifting relay 54 in its plate circuit connects a second shifting relay 55 into the plate circuit of a second control thyratron 51 and de-energizes brake 28 to permit rotation of the second control shaft 11 (FIG. 3).

By means of crank 16, control shaft 11 rocks a plate 58 (see also FIG. 5) about a pivot axis 60. The reflector 40 is attached to plate 58 and rocks with it for adjusting the reflector relative to the lamp in the second axial direction. The voltage comparison circuit operates again in the manner generally described above and re-energizes brake 28 when optimum position is reached on the return movement of the reflector, thereby stopping shaft 11 at that position. At this time, a third shifting relay 56 (FIG. 6) is connected into the plate circuit of a third control thyratron 52 and brake 29 is de-energized to initiate rotation of the third control shaft 12 (FIG. 3).

Crank 17 on shaft 12 rocks a frame 62, which supports plate 58, about a pivot 64 to cause relative movement in the third axial direction. During this third movement brake 17 is re-energized at the optimum position of the lamp in the third axial direction. The lamp is now optically focused in all three axial directions and is ready to be fastened to the reflector, for example, by soldering or welding its base to the reflector in the manner disclosed in the copending application Serial No. 761,568, filed September 17, 1958.

After the lamp and reflector have been fastened together the system is reset by de-energizing all of the brakes and thereby allowing the control shafts 10 to 12 to rotate to their initial positions, where respective reset cams 66, 67 and 68 (FIGS. 1 and 3) close reset switches 70, 71 and 72 (FIG. 6) for the corresponding brakes 27 to 29. The brakes are re-energized through the reset switches and all three control shafts 10 to 12 (FIGS. 1 to 3) are stopped at their initial positions. The fixture is then prepared to accept another lamp and reflector.

*Control Circuit*

Referring to FIG. 6, the control circuit includes the photocell 42 and the previously mentioned pulsing thyratron 48 and control thyratrons 50 to 52, as well as the magnetic brakes 27 to 29 and shifting relays 54 to 56.

The circuit is shown in its initial or reset condition wherein brakes 27 to 29 are all energized through a normally closed switch 138 from a source +B of D.C. potential. Brake 27 is energized from source +B through the normally closed upper contacts of a first set of double-throw contacts 86, which are controlled by a conditioning relay 85, and through a resistor 90, brake 27, the first reset switch 70, a holding resistor 91 for brake 27, the normally closed upper contacts of a third set of double-throw contacts 83 controlled by a start relay 80 and ground. Brake 28 is energized from source +B through the normally closed upper contacts of a set of double-throw contacts 92, which are controlled by the first shifting relay 54, and through a resistor 93, brake 28, the second reset switch 71, a holding resistor 94 for brake 28, and the normally closed upper contacts of a third set of double-throw contacts 88 controlled by the conditioning relay 85 and ground. Brake 29 is energized from +B through the normally closed upper contacts of a set of double-throw contacts 95, which are controlled by the second shifting relay 55, and through a resistor 96, brake 29, the third reset switch 72, a holding resistor 97 for brake 29, the normally closed upper contacts of a second set of double-throw contacts 87 controlled by the conditioning relay 85 and ground.

A first set of contacts 81, controlled by the starting relay 80, normally are closed to short the memory capacitor 44. A second set of contacts 82 of relay 80 normally are open to interrupt supply of power from source +B to the anodes of the photocell 42, a cathode follower 43, a twin diode 45 comprising a lefthand diode 45A and a righthand diode 45B, and the pulsing thyratron 48.

To initiate the alignment cycle the start switch 32 is closed, as previously mentioned, and thereby closes a circuit from +B through the start relay 80 and switch 32 to ground. This energizes relay 80 to reverse its contacts 81 to 83 and thereby open the short circuit across the memory capacitor 44, apply anode voltage to tubes 42, 43, 45 and 48, open the circuit between holding resistor 91 for brake 70 and ground, and connect the cathodes of control thyratrons 50 to 52 to ground through respective cathode resistors 100 to 102 and the lower contacts 82 of relay 80. When anode voltage is supplied to the pulsing thyratron 48, that tube fires and charges a capacitor 105 in its cathode circuit to a potential slightly below +B. The screen grid of thyratron 48 is connected to ground through a pair of resistors 106 and 107 and therefore is at a sufficiently low potential to extinguish that thyratron when capacitor 105 becomes charged.

The reversal of contacts 82 and 83 of relay 80 also completes a circuit from +B through contacts 82, a capacitor 108, a resistor 109 and the lower contacts 83 to ground, and it applies +B voltage through the conditioning relay 85 and a resistor 112 to ground. Reversal of contacts 82 and 83 of relay 80 therefore charges capacitor 108 and develops a positive pulse across resistor 109, which pulse is applied to the grids of the control thyratrons 50 to 52, through respective parallel resistors 114 to 116. The closure of contacts 82 also energizes the conditioning relay 85. The reversal of contacts 83 of relay 80 also connects the cathodes of the control thyratrons 50 to 52 to ground and these thyratrons immediately are fired by the pulse applied through their respective grid resistors 114 to 116. Finally, reversal of contacts 83 opens the grounding circuit from holding resistor 91 for the first brake 27. Therefore all three brakes stand energized through their respective control thyratrons and brakes 28 and 29 also have energizing circuits completed through their respective holding resistors 94 and 97.

When the conditioning relay 85 is energized, it reverses its contacts 86 to 88. Reversal of contacts 86 disconnects source +B from resistor 90 and establishes a circuit from +B through the lower contacts 86, the first shifting relay 54, the first brake 27 and thyratron 50 or holding resistor 91. It is recalled that holding resistor 91 stands disconnected from ground at this time. Also, the transit time of contacts 86 is sufficient to extinguish thyratron 50. Therefore brake 27 is de-energized during the reversal of contacts 86 and is not re-energized when that reversal is completed. Due to the highly inductive nature of brakes 27 to 29, it is desirable to place capacitors 120 to 122, respectively, in parallel with them, thereby insuring the extinction of each thyratron when its anode circuit is interrupted, such as by reversing contacts 86 associated with thyratron 50. The reversal of contacts 87 and 88 of the conditioning relay 85 disconnects the second and third reset switches 71 and 72 from ground, so that the second and third brakes 28 and 29 are then energized solely through their respective control thyratrons 51 and 52.

Summarizing, after switch 32 is closed to energize the start relay 80, the circuit stands with tubes 42, 43, 45, 47 and 48 energized, the first brake 27 de-energized and in series with the first shifting relay 54 and brakes 28 and 29 energized only through their respective control thyratrons 51 and 52.

With brake 27 de-energized, shaft 10 (FIG. 1) is permitted to rotate as previously described. As this shaft moves, adjusting the relative incident on photocell 42 increases to a maximum and then decreases. The photocell output is fed to the control grid of the cathode follower 43 (FIG. 6), which has a cathode resistor 124. In parallel with resistor 124 is the memory capacitor 44 connected in series with the left-hand section 45A of the twin diode 45, the tap of potentiometer 46 and a resistor 125. While the photocell signal, and therefore the output signal from cathode follower 42 is increasing in a positive direction, the memory capacitor 44 is charged through diode 45A until it reaches a maximum voltage, which is a manifestation or representation of the maximum light intensity on the photocell during the first relative movement between the lamp and reflector in the first axial direction.

During the charging of capacitor 44 there is a negligible voltage drop across the diode 45A; therefore, the voltage applied to the control grid of the pulsing thyratron 48, which control grid is connected to the diode side of capacitor 44 through a resistor 129, remains substantially equal to the tap voltage on potentiometer 46. This grid voltage is preset, by adjustment of potentiometer 46, at the grid-firing potential of tube 48 when its cathode is at a steady-state potential determined by the clamping action of diode 45B on a potential divider comprising, in series, a pair of resistors 131 and 132, potentiometer 46 and resistor 125. Diode 45B is connected between the low potential side of resistor 131 and the high potential side of capacitor 105.

It is recalled that capacitor 105 was charged to +B potential minus the potential drop across tube 48 when the start switch 32 was closed. The time constant of capacitor 105 and resistor 107 is such that the cathode potential of tube 48 remains sufficiently positive to prevent that tube from firing during the first relative movement of the lamp and reflector. As long as the voltage across capacitor 105 remains greater than the voltage across the series circuit comprising resistor 132, potentiometer 46 and resistor 125, diode 45B does not conduct and the potential across capacitor 105 decays toward ground. When the potential across capacitor 105 falls below that of the anode of diode 45B, that diode conducts and clamps the cathode voltage of the pulsing thyratron 48 at the cathode potential of diode 45B.

When the photocell signal passes its maximum value and begins to decrease, a voltage corresponding to that maximum signal is stored on the memory capacitor 44, which is prevented by diode 45A from discharging. Therefore, the anode potential of diode 45A falls below the cathode potential of that diode when the photocell signal decreases and is applied to the control grid of the pulsing thyratron 48, thereby biasing the latter tube below conduction and maintaining it so biased until the photocell signal returns to its maximum value during the return movement of the lamp in the same axial direction. When the photocell output increases, during this return movement, it is compared to the potential stored on capacitor 44 by gradually raising the control-grid bias potential of the pulsing thyratron 48. The comparison produces a match when the voltage across diode 45A returns to zero, at which time the match is detected by the firing of tube 48, now biased to conduction.

When tube 48 conducts, its anode current charges capacitor 105 to +B minus the drop across tube 48. The charging of capacitor 105 biases the cathode of tube 48 positive with respect to its control grid and the anode current is limited to a small value by resistor 107, so that tube 48 is extinguished. The positive-going pulse generated by the momentary conduction of thyratron 48 is transmitted in parallel to the inputs of the three control thyratrons 50 to 52 after being differentiated by a series capacitor 134 and a shunt resistor 136. The first control thyratron 50, the only nonconducting control thyratron, is fired by this pulse and energizes brake 27 and the first shifting relay 54, with which thyratron 50 has been connected in series as previously described.

Brake 27 stops shaft 10 (FIG. 1) with the lamp and reflector properly aligned in the first axial direction. Shifting relay 54 (FIG. 6) reverses contacts 92 to disconnect resistor 93 from the anode circuit of the second control thyratron 51 and connect the second shifting relay 55 into that anode circuit.

During the reversal of contacts 92, thyratron 51 is extinguished since its holding resistor stands disconnected from ground as previously described. Therefore the second brake 28 is de-energized and permits shaft 11 (FIG. 3) to rotate for aligning the lamp and reflector in the second axial direction.

When alignment is achieved in the second axial direction, by operation of the memory and comparison components of the control circuit as described in relation to the first axial direction, thyratron 51 is fired to re-energize brake 28 and the second shifting relay 55, thereby stopping shaft 11 (FIG. 3) at a position where the lamp and reflector are in optimum alignment in the second axial direction and reversing contacts 95 (FIG. 6) to extinguish the third control thyratron 52 and connect the third shifting relay into its anode circuit. This de-energizes the third brake 29 to initiate the alignment cycle in the third axial direction by rotation of shaft 12 (FIG. 3). When alignment is achieved in the third axial direction, thyratron 52 (FIG. 6) is fired to re-energize brake 29 and thereby stop shaft 12 (FIG. 3) and energize the third shifting relay 56. This relay opens switch 138, through which +B power normally is supplied to the circuit, thereby removing +B power from the entire circuit. Relay 80 is de-energized to reverse contacts 81 to 83, thereby shorting the memory capacitor 44 and disconnecting control thyratrons 50 to 52 from ground. The start switch 32 may then be opened to place the entire circuit in its reset condition in preparation for another aligning operation.

The invention has been described in detail with particular reference to preferred embodiments thereof, but it will be understood that variations and modifications can be effected within the spirit and scope of the invention as described hereinabove and as defined in the appended claims. It is particularly understood that the apparatus described hereinabove is merely illustrative of those that may be employed for practicing the method of the invention. For example, it will be obvious that numerous memory and comparison devices well known in the art may be substituted for those disclosed in the foregoing specification and the accompanying drawings, and that standard vacuum-tube switching circuitry may be substituted for the disclosed relay controlled switches.

We claim:

1. The method of accurately aligning an energized lamp with a reflector, comprising: causing relative movement between the lamp and the reflector from one extreme position to the opposite extreme position; generating a first signal representing the maximum intensity of light received from said lamp and reflector at a predetermined locus during said relative movement; causing a return relative movement between the lamp and the reflector from said opposite extreme position toward said one extreme position; generating a second signal representing the intensity of light at said locus during said return relative movement; and stopping said return relative movement when said first and second signals become substantially equal.

2. The method defined in claim 1, wherein said relative movements comprise moving said lamp and holding said reflector stationary.

3. The method defined in claim 1, wherein said relative movements comprise moving said reflector and holding said lamp stationary.

4. The method defined in claim 1 repeated for each of three seriatim relative movements between said lamp and reflector in three corresponding coordinate axial directions.

5. The method of accurately aligning an energized lamp with a reflector, comprising the following steps with respect to each of three seriatim relative movements between the lamp and the reflector in three corresponding coordinate axial directions: causing relative movement between the lamp and the reflector from one extreme position to the opposite extreme position; generating a first signal representing the maximum intensity of light received from said lamp and reflector at a predetermined locus during said relative movement; storing said first signal; causing a return relative movement between the lamp and the reflector from said opposite extreme position toward said one extreme position; generating a second signal representing the intensity of light at said locus during said return relative movement; and stopping said return relative movement when said first and second signals become substantially equal.

6. Apparatus for aligning an energized lamp with a reflector therefor, comprising: means for supporting said lamp; means for supporting said reflector; adjusting means for moving one of said supporting means relative to the other from a first extreme position to a second extreme position and back toward said first extreme position; a light-sensitive device disposed at a predetermined locus for illumination by light transmitted by said lamp and reflector and adapted to generate an electrical signal having a characteristic which is a function of the intensity of said light at said locus; a memory device connected to said light-sensitive device for storing a manifestation of said signal corresponding to the maximum intensity of said light at said locus during the relative movement from said first to said second extreme position; means interrelating said light-sensitive device and said memory device for comparing said stored manifestation to said signal during the relative movement from said second toward said first extreme position; means for sensing substantial equality between the signal characteristic corresponding to said stored manifestation and the signal characteristic occurring during said last-named relative movement; and means controlled by said sensing means for stopping said last-named relative movement in response to said sensing of equality of signal characteristics.

7. The aligning apparatus defined in claim 6, wherein said memory device comprises an electrical capacitor.

8. The aligning apparatus defined in claim 6, wherein said adjusting means comprises: a normally moving first drive member; a second drive member connected in driving relation to one of said supporting means; and a yieldable driving connection between said first and second drive members; and wherein said sensing means comprises a brake cooperating with said second drive member and energized by said sensing means in response to said sensing of equality of signal characteristics.

9. The aligning apparatus defined in claim 6, with: a normally disabled second adjusting means operable, upon being enabled, for moving one of said supporting means relative to the other in a direction substantially perpendicular to the direction of said first-named movement; and means controlled by said sensing means, in response to said sensing of equality of signal characteristics, for enabling said second adjusting means.

10. The method of accurately aligning an energized lamp with a reflector, comprising: causing relative movement between the lamp and the reflector from one extreme position to the opposite extreme position; generating a first signal proportional to the intensity of light received from said lamp and reflector at a predetermined locus during said relative movement; storing the manifestation of said first signal which corresponds to the maximum intensity of light received from said lamp and reflector at a predetermined locus during said relative movement; causing a return relative movement between said lamp and reflector from said opposite extreme position toward said one extreme position; generating a second signal related to said first signal by being equally proportional to said intensity of light; and stopping said return relative movement at a position wherein said second signal substantially equals said maximum intensity signal.

11. The method defined in claim 10 repeated for each of three seriatim relative movements between said lamp and reflector in three corresponding coordinate axial directions.

No references cited.

UNITED STATES PATENT OFFICE
CERTIFICATE OF CORRECTION

Patent No. 3,043,184                            July 10, 1962

Charles S. Fitzgerald et al.

It is hereby certified that error appears in the above numbered patent requiring correction and that the said Letters Patent should read as corrected below.

Column 6, line 66, and column 7, line 18, for "when", each occurrence, read -- at a position wherein --.

Signed and sealed this 8th day of January 1963.

SEAL)
Attest:

ERNEST W. SWIDER                          DAVID L. LADD
Attesting Officer                            Commissioner of Patents